(12) United States Patent
Agarwal et al.

(10) Patent No.: US 12,137,363 B2
(45) Date of Patent: Nov. 5, 2024

(54) TECHNIQUES FOR MEASUREMENT ORDER FOR CARRIER AGGREGATION

(71) Applicant: QUALCOMM Incorporated, San Diego, CA (US)

(72) Inventors: Nitin Agarwal, San Diego, CA (US); Arvind Vardarajan Santhanam, San Diego, CA (US); Mouaffac Ambriss, San Diego, CA (US); Girish Khandelwal, San Diego, CA (US); Bhupesh Manoharlal Umatt, Poway, CA (US); Sumit Kumar Singh, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 353 days.

(21) Appl. No.: 17/644,266

(22) Filed: Dec. 14, 2021

(65) Prior Publication Data

US 2023/0189033 A1 Jun. 15, 2023

(51) Int. Cl.
*H04W 72/23* (2023.01)
*H04L 5/14* (2006.01)
*H04W 24/10* (2009.01)
*H04W 72/0453* (2023.01)
*H04W 72/56* (2023.01)

(52) U.S. Cl.
CPC ............... *H04W 24/10* (2013.01); *H04L 5/14* (2013.01); *H04W 72/0453* (2013.01); *H04W 72/23* (2023.01); *H04W 72/56* (2023.01)

(58) Field of Classification Search
CPC ............. H04W 36/0094; H04W 24/10; H04W 72/0453; H04W 72/23; H04W 72/56; H04L 5/14; H04L 5/1469; H04L 5/0092; H04L 5/001; H04L 5/0064; H04L 5/0028; H04L 5/0023; H04L 5/0032; H04L 5/0048

See application file for complete search history.

(56) References Cited

U.S. PATENT DOCUMENTS

| | | | |
|---|---|---|---|
| 9,661,507 B2 | 5/2017 | Takano | |
| 10,757,741 B1* | 8/2020 | Oroskar | ................ H04W 24/00 |
| 11,844,013 B1* | 12/2023 | Shahid | .................. H04W 48/16 |
| 2021/0037403 A1* | 2/2021 | Kim | ...................... H04W 24/08 |
| 2021/0195439 A1 | 6/2021 | Prabhakar et al. | |
| 2021/0345203 A1* | 11/2021 | Balasubramanian | ........................ H04W 60/04 |

(Continued)

FOREIGN PATENT DOCUMENTS

WO 2021102184 A2 5/2021

OTHER PUBLICATIONS

International Search Report and Written Opinion—PCT/US2022/080112—ISA/EPO—Mar. 15, 2023.

*Primary Examiner* — Chi Ho A Lee
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive a measurement configuration for a plurality of cells. The UE may perform measurement of each of the plurality of cells in an order, wherein the order is based at least in part on a priority, wherein the priority is based at least in part on an aggregated downlink bandwidth. The UE may transmit a measurement report based at least in part on the order. Numerous other aspects are described.

30 Claims, 7 Drawing Sheets

(56) References Cited

U.S. PATENT DOCUMENTS

| | | | | |
|---|---|---|---|---|
| 2021/0377829 A1* | 12/2021 | Wang | ................ | H04W 36/0094 |
| 2022/0191779 A1* | 6/2022 | Bergqvist | .............. | H04W 24/10 |
| 2022/0322182 A1* | 10/2022 | Lee | ...................... | H04B 7/0617 |
| 2022/0359247 A1* | 11/2022 | Rathert | ................ | G01R 31/287 |
| 2022/0400418 A1* | 12/2022 | Kim | ...................... | H04W 48/20 |
| 2023/0059448 A1* | 2/2023 | Mattam | ................. | H04W 36/36 |
| 2023/0308240 A1* | 9/2023 | Cha | ....................... | H04W 16/28 |
| 2023/0362762 A1* | 11/2023 | Yang | ................. | H04W 36/0085 |

* cited by examiner

TECHNIQUES FOR MEASUREMENT ORDER FOR CARRIER AGGREGATION

FIELD OF THE DISCLOSURE

Aspects of the present disclosure generally relate to wireless communication and to techniques and apparatuses for measurement ordering for carrier aggregation.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a measurement configuration for a plurality of cells. The method may include performing measurement of each of the plurality of cells in an order, wherein the order is based at least in part on a priority, wherein the priority is based at least in part on an aggregated downlink bandwidth. The method may include transmitting a measurement report based at least in part on the order.

Some aspects described herein relate to a UE for wireless communication. The user equipment may include a memory and one or more processors coupled to the memory. The one or more processors may be configured to receive a measurement configuration for a plurality of cells. The one or more processors may be configured to perform measurement of each of the plurality of cells in an order, wherein the order is based at least in part on a priority, wherein the priority is based at least in part on an aggregated downlink bandwidth. The one or more processors may be configured to transmit a measurement report based at least in part on the order.

Some aspects described herein relate to a non-transitory computer-readable medium that stores a set of instructions for wireless communication by a UE. The set of instructions, when executed by one or more processors of the UE, may cause the UE to receive a measurement configuration for a plurality of cells. The set of instructions, when executed by one or more processors of the UE, may cause the UE to perform measurement of each of the plurality of cells in an order, wherein the order is based at least in part on a priority, wherein the priority is based at least in part on an aggregated downlink bandwidth. The set of instructions, when executed by one or more processors of the UE, may cause the UE to transmit a measurement report based at least in part on the order.

Some aspects described herein relate to an apparatus for wireless communication. The apparatus may include means for receiving a measurement configuration for a plurality of cells. The apparatus may include means for performing measurement of each of the plurality of cells in an order, wherein the order is based at least in part on a priority, wherein the priority is based at least in part on an aggregated downlink bandwidth. The apparatus may include means for transmitting a measurement report based at least in part on the order.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
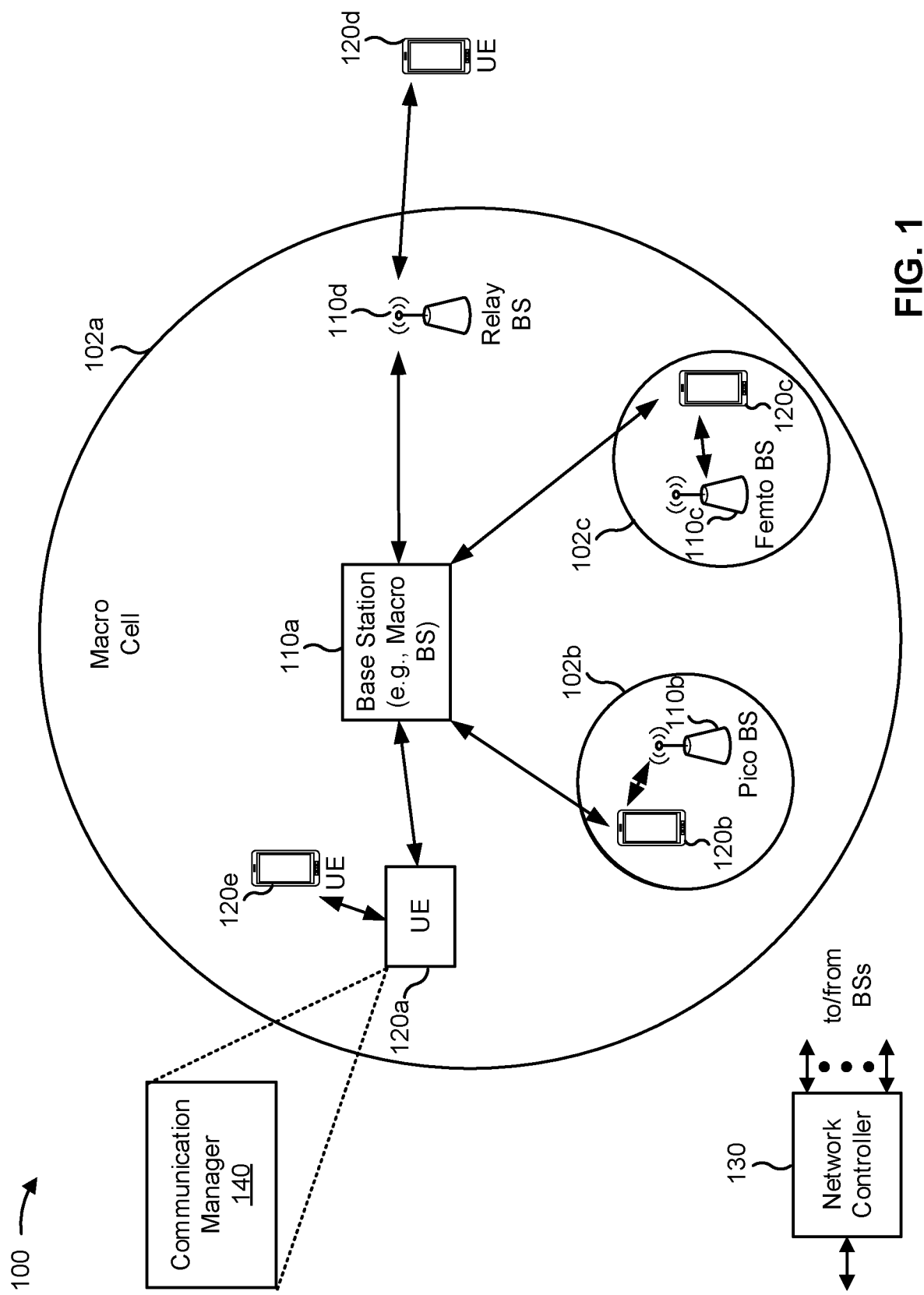
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a measurement configuration for a plurality of cells; perform measurement of each of the plurality of cells in an order, wherein the order is based at least in part on a priority, wherein the priority is based at least in part on an aggregated downlink bandwidth; and transmit a measurement report based at least in part on the order. Additionally, or alternatively, the communication manager 140 may perform one or more other operations described herein.

As indicated above, FIG. 1 is provided as an example. Other examples may differ from what is described with regard to FIG. 1.

Figure 2:
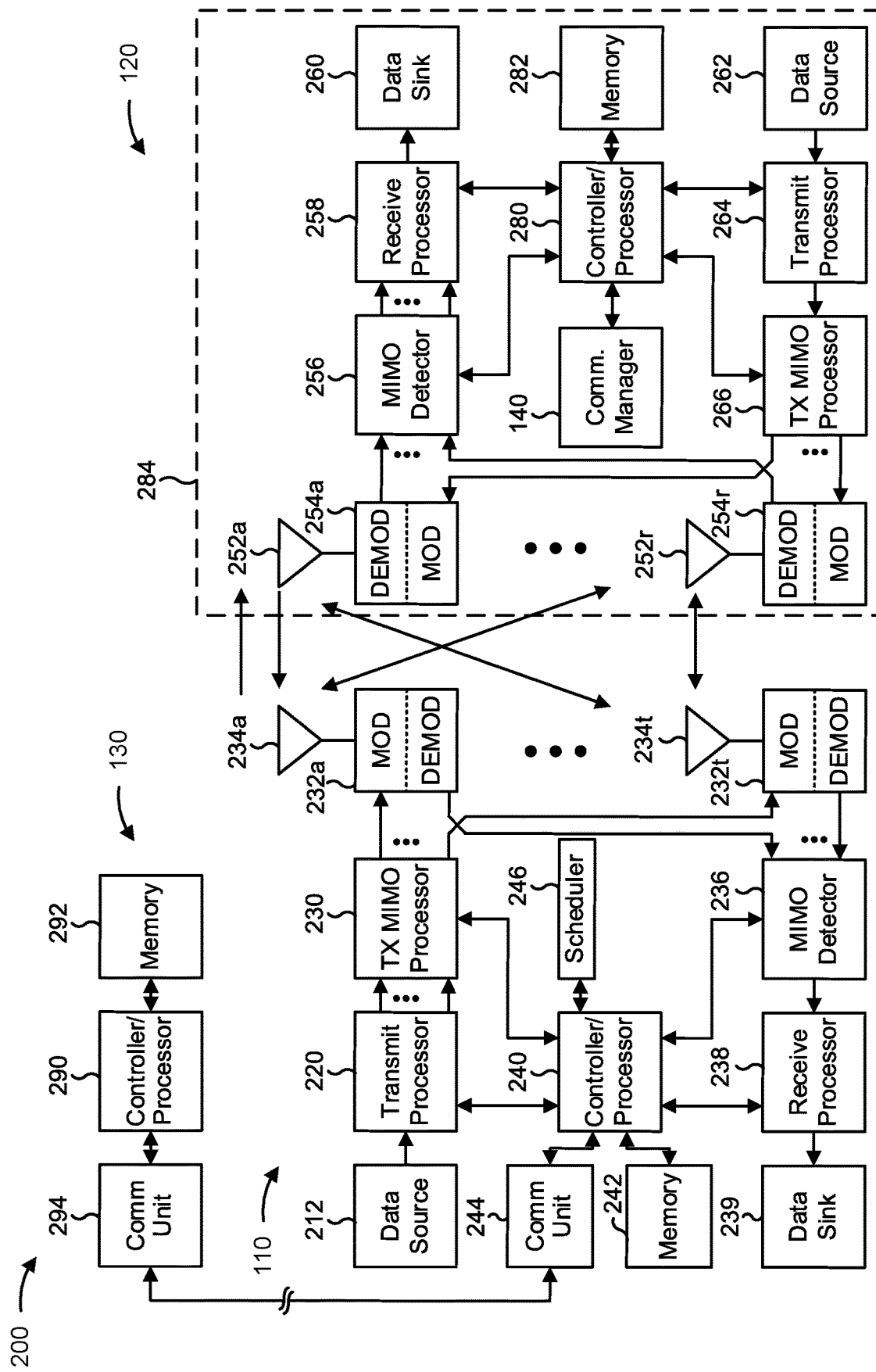
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-7).

The controller/processor 240 of the base station 110, the controller/processor 280 of the UE 120, and/or any other component(s) of FIG. 2 may perform one or more techniques associated with measurement ordering for carrier aggregation, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, and/or other processes as described herein. In some examples, executing instructions may include running the instructions, converting the instructions, compiling the instructions, and/or interpreting the instructions, among other examples.

In some aspects, the UE includes means for receiving a measurement configuration for a plurality of cells; means for performing measurement of each of the plurality of cells in an order, wherein the order is based at least in part on a priority, wherein the priority is based at least in part on an aggregated downlink bandwidth; and/or means for transmitting a measurement report based at least in part on the order. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
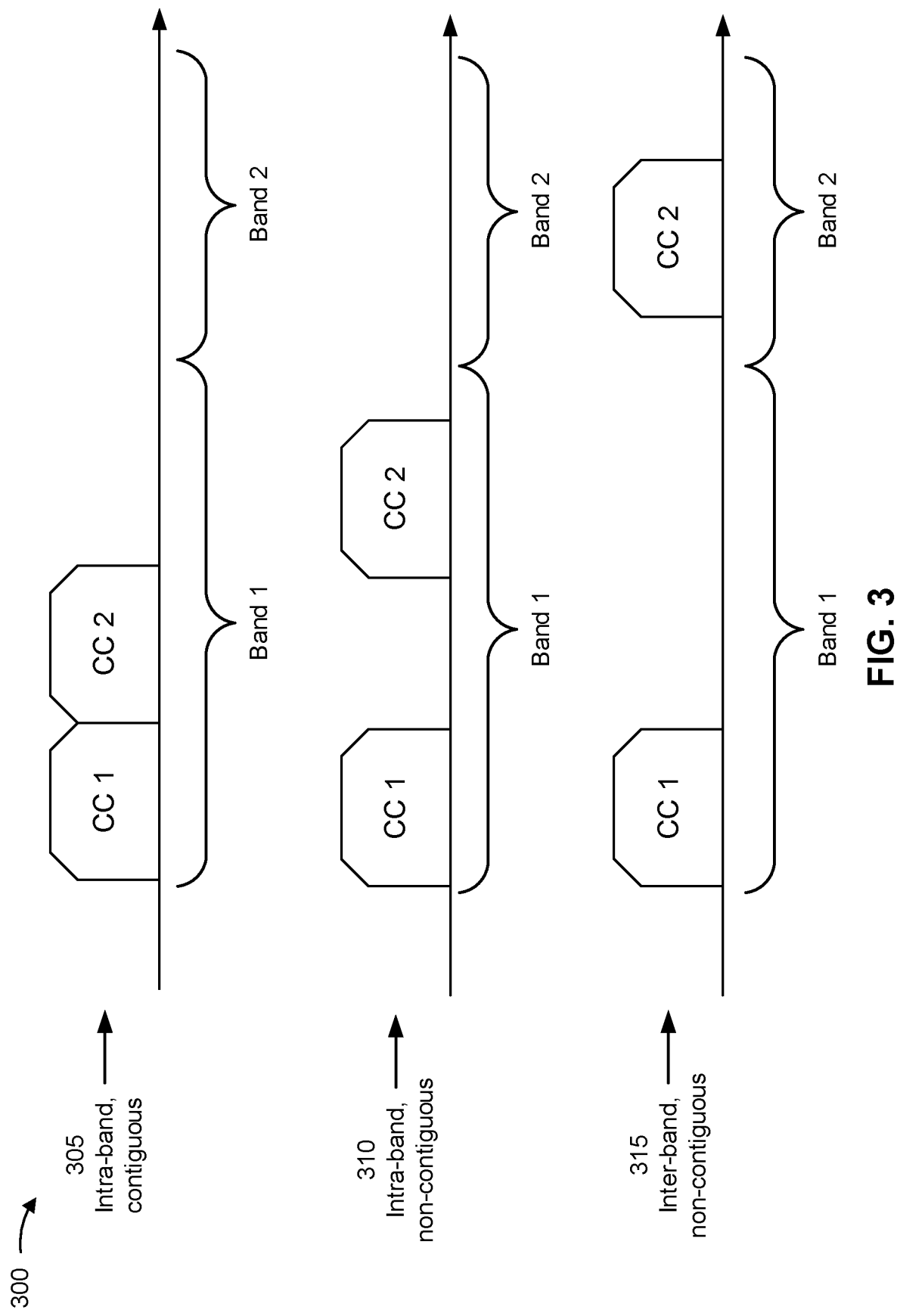
FIG. 3 is a diagram illustrating examples of carrier aggregation, in accordance with the present disclosure.

FIG. 3 is a diagram illustrating examples 300 of carrier aggregation, in accordance with the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A base station 110 may configure carrier aggregation for a UE 120, such as in a radio resource control (RRC) message, downlink control information (DCI), and/or another signaling message.

As shown by reference number 305, in some aspects, carrier aggregation may be configured in an intra-band contiguous mode where the aggregated carriers are contiguous to one another and are in the same band. As shown by reference number 310, in some aspects, carrier aggregation may be configured in an intra-band non-contiguous mode where the aggregated carriers are non-contiguous to one another and are in the same band. As shown by reference number 315, in some aspects, carrier aggregation may be configured in an inter-band non-contiguous mode where the aggregated carriers are non-contiguous to one another and are in different bands.

In carrier aggregation, a UE 120 may be configured with a primary carrier or primary cell (PCell) and one or more secondary carriers or secondary cells (SCells). In some aspects, the primary carrier may carry control information (e.g., downlink control information and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

Techniques described herein provide arrangement of an order for scheduling and/or reporting of measurements on an NR RAT based at least in part on a carrier aggregation and/or dual connectivity configuration of the UE 120, as described below.

As indicated above, FIG. 3 is provided as an example. Other examples may differ from what is described with regard to FIG. 3.

Figure 4:
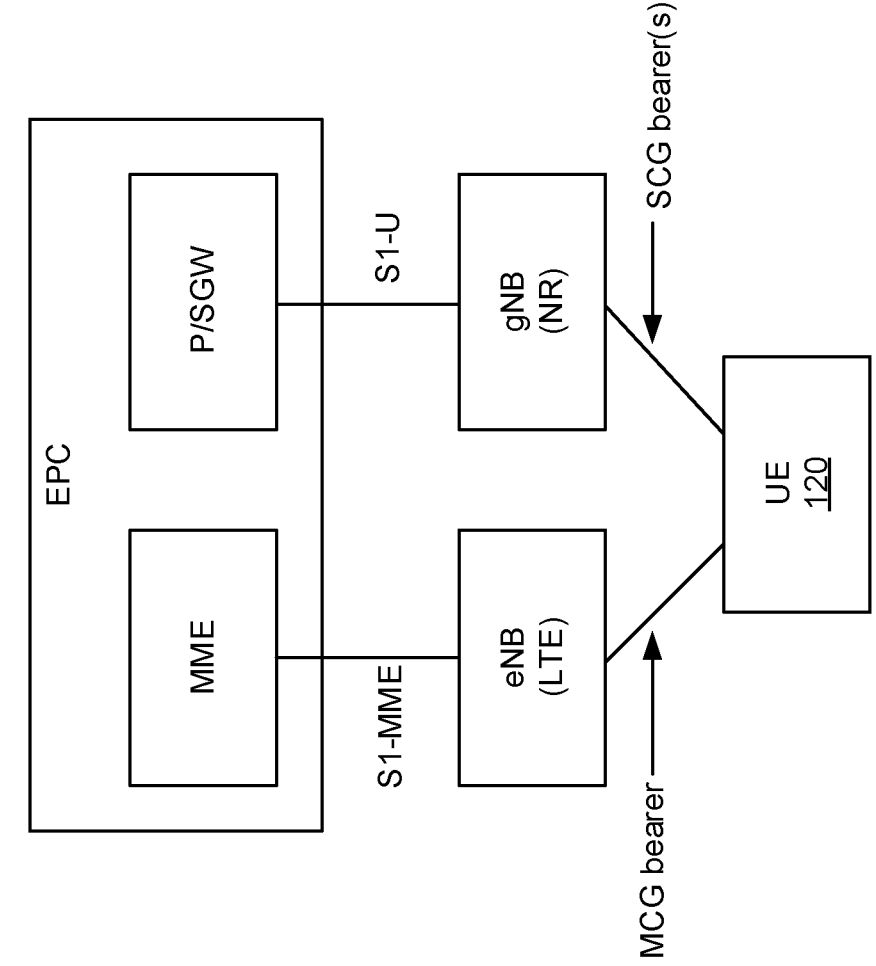
FIG. 4 is a diagram illustrating an example of dual connectivity, in accordance with the present disclosure.

FIG. 4 is a diagram illustrating an example 400 of dual connectivity, in accordance with the present disclosure. The example shown in FIG. 4 is for an Evolved Universal Mobile Telecommunications System Terrestrial Radio Access (E-UTRA)-NR dual connectivity (ENDC) mode. In the ENDC mode, a UE 120 communicates using an LTE RAT on a master cell group (MCG), and the UE 120 communicates using an NR RAT on a secondary cell group (SCG). However, aspects described herein may apply to an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT), or another dual connectivity mode (e.g., where the MCG is associated with a first RAT and the SCG is associated with one of the first RAT or a second RAT). The ENDC mode is sometimes referred to as an NR or 5G non-standalone (NSA) mode. Thus, as used herein, "dual connectivity mode" may refer to an ENDC mode, an NEDC mode, an NRDC mode, and/or another type of dual connectivity mode. Furthermore, references herein to carrier aggregation should be understood to also apply to dual connectivity, unless explicitly indicated otherwise.

As shown in FIG. 4, a UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or other devices. In FIG. 4, the PGW and the SGW are shown collectively as P/SGW. In some aspects, the eNB and the gNB may be co-located at the same base station 110. In some aspects, the eNB and the gNB may be included in different base stations 110 (e.g., may not be co-located).

As further shown in FIG. 4, in some aspects, a wireless network that permits operation in a 5G NSA mode may permit such operations using an MCG for a first RAT (e.g., an LTE RAT or a 4G RAT) and an SCG for a second RAT (e.g., an NR RAT or a 5G RAT). In this case, the UE 120 may communicate with the eNB via the MCG, and the UE 120 may communicate with the gNB via the SCG. In some aspects, the MCG may anchor a network connection between the UE 120 and the 4G/LTE core network (e.g., for mobility, coverage, and/or control plane information), and the SCG may be added as additional carriers to increase throughput (e.g., for data traffic and/or user plane information). In some aspects, the gNB and the eNB may not transfer user plane information between one another. In some aspects, a UE 120 operating in a dual connectivity mode may be concurrently connected with an LTE base station 110 (e.g., an eNB) and an NR base station 110 (e.g., a gNB) (e.g., in the case of ENDC or NEDC), or may be concurrently connected with one or more base stations 110 that use the same RAT (e.g., in the case of NRDC). In some aspects, the MCG may be associated with a first frequency band (e.g., a sub-6 GHz band and/or an FR1 band) and the SCG may be associated with a second frequency band (e.g., a millimeter wave band and/or an FR2 band).

The UE 120 may communicate via the MCG and the SCG using one or more radio bearers (e.g., data radio bearers (DRBs) and/or signaling radio bearers (SRBs)). For example, the UE 120 may transmit or receive data via the MCG and/or the SCG using one or more DRBs. Similarly, the UE 120 may transmit or receive control information (e.g., RRC information and/or measurement reports) using one or more SRBs. In some aspects, a radio bearer may be dedicated to a specific cell group (e.g., a radio bearer may be an MCG bearer or an SCG bearer). In some aspects, a radio bearer may be a split radio bearer. A split radio bearer may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

Techniques described herein provide arrangement of an order for scheduling and/or reporting of measurements on an NR RAT based at least in part on a carrier aggregation and/or dual connectivity configuration of the UE 120, as described below.

As indicated above, FIG. 4 is provided as an example. Other examples may differ from what is described with respect to FIG. 4.

A UE may communicate on a cell combination of multiple different cells, such as using a carrier aggregation configuration (described in connection with FIG. 3), a dual connectivity configuration (described in connection with FIG. 4), or a combination thereof. Communication on multiple cells may enable increased data rates, such as by enabling the usage of increasingly sophisticated modulation schemes (such as 256 quadrature amplitude modulation). Some cell combinations may be more suitable than other cell combinations for a particular purpose. For example, a first cell combination may be associated with a higher bandwidth than a second cell combination. As another example, a particular cell combination may have only a single cell on a given RAT, which diminishes throughput on the given RAT. As yet another example, a first cell combination may have a time division duplexing (TDD) cell as a primary component carrier (PCC), and a second cell combination may have a frequency division duplexing (FDD) cell as a PCC, which leads to different throughput, bandwidth, reliability, and/or performance between the first cell combination and the second cell combination.

A base station may configure a UE to perform measurements to support mobility operations, such as handover, redirection, or reselection. For example, the base station may configure the UE with a measurement configuration indicating a plurality of measurement objects. A measurement object may indicate a frequency location, a time location, and a subcarrier spacing of a reference signal on which a measurement is to be performed, and the measurement may identify the reference signal. In some aspects, for inter-system measurements, a measurement object may indicate a specific carrier (e.g., an LTE carrier) and a corresponding measurement bandwidth. The UE may perform measurements in an order and may transmit a measurement report regarding a cell if a measurement on the cell satisfies a condition indicated by a reporting configuration of the measurement configuration.

As mentioned above, some cell combinations may be more suitable than other cell combinations for a particular purpose. For example, in practice, a particular primary cell (e.g., a PCell or a primary secondary cell (PSCell)) may generally be expected to be configured with the same one or more secondary cells by a base station. The cell combination associated with a first primary cell may be more suitable than the cell combination associated with a second primary cell, such as due to bandwidth, a number of component carriers, whether the cell combination includes TDD and/or FDD carriers, or the like. However, the measurement objects of the measurement configuration may not be defined optimally and may not be arranged by the base station to prioritize measurement and reporting on primary cells associated with a favorable cell combination for the UE. If the UE reports a measurement associated with an unsuitable primary cell, the base station may configure a handover to the unsuitable primary cell, and then may have to perform further RRC reconfiguration or redirection to a more suitable primary cell. Thus, signaling overhead is increased, bandwidth is reduced, throughput is reduced, and delay is introduced.

Some techniques and apparatuses described herein provide for a UE to assign an order to a set of measurement objects based at least in part on a priority, where the priority is based at least in part on an aggregated downlink bandwidth associated with a cell combination. For example, the aggregated downlink bandwidth for a particular cell may represent the sum of downlink bandwidths of each cell of a cell combination (for carrier aggregation (CA) or dual connectivity (DC)) for which the particular cell is a primary cell. Thus, the UE may prioritize measurements and reporting on cells expected to provide a larger downlink bandwidth, which increases bandwidth available for communication at the UE. Furthermore, by prioritizing the measurements and reporting on such cells, the UE may reduce overhead and delay associated with reconfiguration after selection of an unsuitable primary cell.

Figure 5:
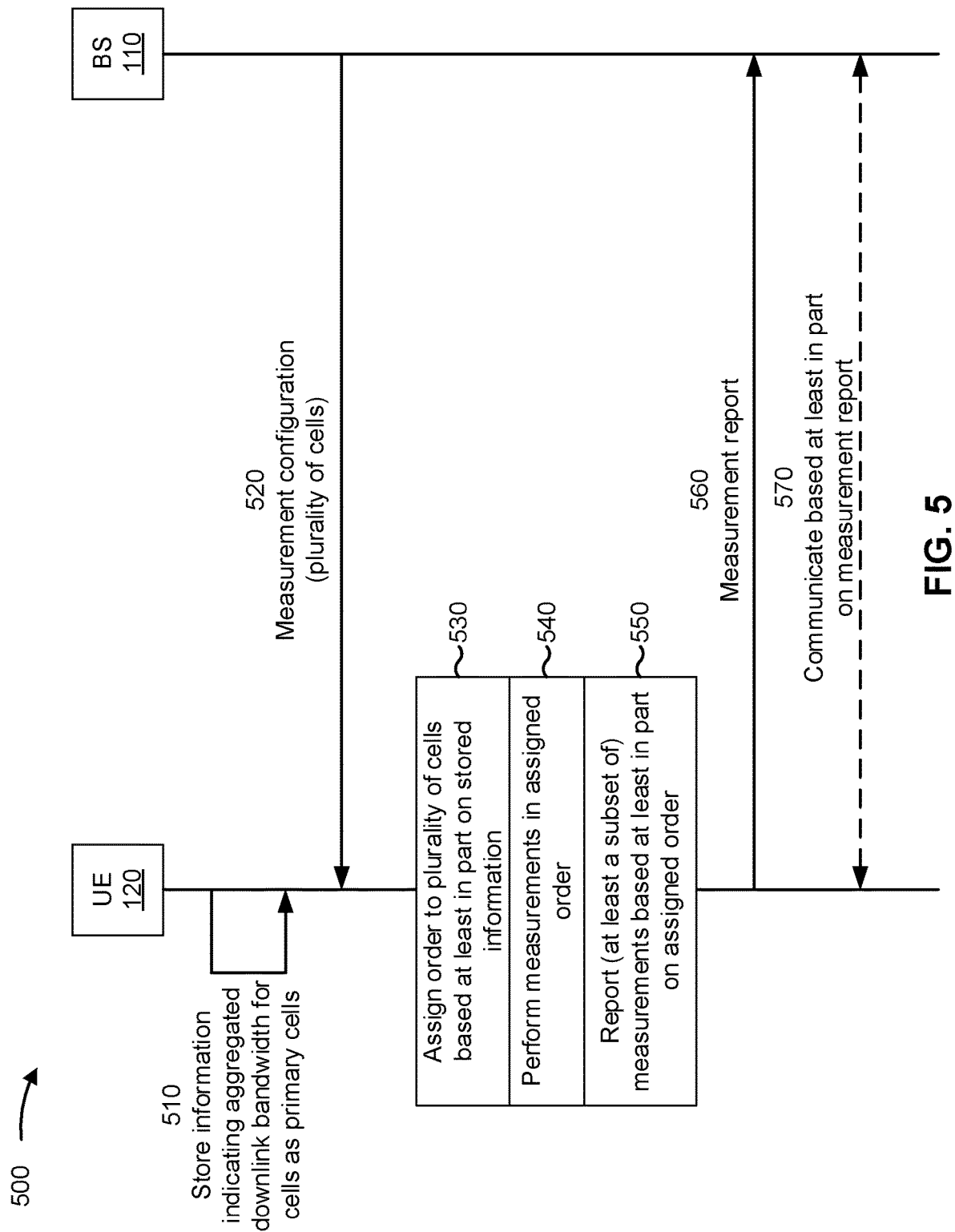
FIG. 5 is a diagram illustrating an example of signaling associated with determination of a measurement order for carrier aggregation, in accordance with the present disclosure.

FIG. 5 is a diagram illustrating an example 500 of signaling associated with determination of a measurement order for carrier aggregation, in accordance with the present disclosure. As shown, FIG. 5 includes a UE 120 and a BS 110.

As shown in FIG. 5, and by reference number 510, the UE 120 may store information indicating aggregated downlink bandwidths for cells. For example, the information may indicate, for a cell, an aggregated downlink bandwidth associated with the cell as a primary cell. In some aspects, the information may indicate, for a primary cell, a sum of downlink bandwidths associated with each secondary cell associated with the primary cell (e.g., each cell of a carrier aggregation configuration associated with the primary cell, each cell of a cell group for which the primary cell is a PCell or a PSCell, etc.). In some aspects, the information may indicate one or more secondary cells associated with the cell (e.g., the one or more secondary cells for which the aggregated downlink bandwidth is determined). In some aspects, the information may indicate an individual bandwidth of the cell. For example, if the cell is configured with a 30 MHz bandwidth, the individual bandwidth of the cell may be 30 MHz. In some aspects, a bandwidth of the cell may be modified. For example, if the cell is a TDD cell, the stored information may indicate a scaled bandwidth, such as a bandwidth scaled by X, where X is less than 1 (e.g., stored bandwidth=configured bandwidth*X). Thus, the UE 120 may account for a decreased effective bandwidth due to the presence of uplink slots in a TDD cell.

In some aspects, the stored information may indicate a duplexing configuration of a cell and/or one or more associated secondary cell (e.g., TDD versus FDD). In some aspects, the stored information may indicate a band associated with the cell and/or the one or more associated cells. In some aspects, the stored information may indicate an identity associated with the cell and/or the one or more associated cells, such as a cell global identity (CGI) or the like. In some aspects, the stored information may indicate a time at which information pertaining to a cell was measured or stored.

In some aspects, the UE 120 may store the information based at least in part on adding a cell as a PCell or a PSCell. In some aspects, the UE 120 may store the information for a PCell based at least in part on being handed over to the PCell. In some aspects, one or more UEs may share the stored information (e.g., among UEs within a threshold distance of one another, among UEs connected to the same PCell, or the like). In some aspects, the UE 120 may store the information for a number of past occurrences of addition or handover, such as for the last 20 occurrences of addition or handover.

As shown by reference number 520, the BS 110 may provide a measurement configuration to the UE 120. The measurement configuration may indicate parameters for performing measurements on a plurality of cells. For example, the measurement configuration may include at least a measurement object. A measurement object, as mentioned herein, may indicate a frequency location, a time location, and a subcarrier spacing of a reference signal on which a measurement to be performed, and may identify the reference signal. In some aspects, for inter-system measurements, a measurement object may indicate a specific carrier (e.g., an LTE carrier) and a corresponding measurement bandwidth. In some aspects, the measurement configuration may indicate a reporting configuration, which may indicate conditions for reporting a measurement, such as a threshold for reporting the measurement, an offset for reporting the measurement, or the like.

As shown by reference number 530, the UE 120 may assign an order to the plurality of cells. In some aspects, the UE 120 may assign an order to the plurality of measurement objects, such that the UE 120 may prioritize measurements on certain cells over measurements on other cells. The UE 120 may assign the order to the plurality of cells based at least in part on a priority. For example, the priority may indicate one or more parameters based on which to assign the order to the priority of the cells.

In some aspects, the order may be based at least in part on an aggregated downlink bandwidth indicated by the stored information. For example, the UE 120 may assign the order such that a cell associated with a highest aggregated downlink bandwidth (for the cell as a PCell or a PSCell) is measured first, then a cell associated with a second-highest aggregated downlink bandwidth (for the cell as a PCell or a PSCell) is measured second, and so on. In some aspects, if a first cell and a second cell are associated with the same aggregated downlink bandwidth, the UE 120 may assign an order to the first cell and the second cell based at least in part on an individual downlink bandwidth of the first cell and an individual downlink bandwidth of the second cell. For example, the UE 120 assign the order such that a cell, of the first cell and the second cell, associated with a higher individual downlink bandwidth is measurement first.

In some aspects, the order may be based at least in part on a duplexing configuration of a cell. For example, the UE 120 may prioritize measurement on TDD cells over FDD cells. As another example, the UE 120 may prioritize measurement on FDD cells over measurement on TDD cells. In some aspects, the UE 120 may determine the duplexing configuration of the cell. For example, the UE 120 may determine (e.g., infer) the duplexing configuration for a cell based at least in part on the stored information (e.g., the stored information may indicate the duplexing configuration, or the UE 120 may determine the duplexing configuration based at least in part on an aggregated downlink bandwidth or an individual downlink bandwidth indicated by the stored information). Additional detail is provided below.

In some aspects, the order may be based at least in part on an achievable data rate on a cell (e.g., which may be determined based at least in part on the stored information or may be crowdsourced from other UEs), such as based at least in part on an uplink and/or downlink scheduling rate, an average number of layers of a communication, a modulation and coding scheme, a relative signal quality metric, or the like.

In some aspects, the order may be based at least in part on a network capability. For example, if the network does not support NSA mode with a TDD+FDD configuration (e.g., a TDD PCell and an FDD SCell), but supports an FDD+TDD configuration, then the UE 120 may prioritize measurement on FDD PCells. In some aspects, the order may be based at least in part on a mobility capability of the network. For example, the order may be based at least in part on whether the network can trigger a handover from a cell associated with a first duplexing configuration to a cell associated with a second duplexing configuration.

In some aspects, the UE 120 may selectively perform prioritization (e.g., may selectively assign the order to the cells as described with regard to reference number 530, or may selectively assign an order to measurement reporting) based at least in part on one or more criteria. For example, the UE 120 may determine whether a trigger condition associated with assigning the order to the plurality of cells is satisfied, and the UE 120 may assign the order if the trigger condition is satisfied. In some aspects, the trigger condition may be based at least in part on a service. For example, if a service (e.g., a Voice over New Radio (VoNR) call) is active, then the UE 120 may prioritize FDD cell measurements over TDD cell measurements, such that a handover to an FDD cell (which may be more reliable than a TDD cell) is triggered. In some aspects, the trigger condition may be based at least in part on a cost function. For example, the cost function may be based at least in part on a throughput associated with a cell and a power consumption associated with the cell. In such examples, a TDD cell may provide improved performance relative to an FDD+TDD NSA mode due to the capability to perform bandwidth part switching of the TDD cell. In some aspects, the trigger condition may be based at least in part on a context associated with the UE 120. For example, if the UE 120's display is inactive, then the UE 120 may prioritize selection of cells associated with a lower power consumption over cells associated with a higher power consumption. In some aspects, the trigger condition may be based at least in part on a device type of the UE 120. For example, the UE 120 may not perform prioritization if the UE 120 is a customer premises equipment or a low mobility device (e.g., on the assumption that a customer premises equipment is unlikely to be associated with high mobility). As another example, the UE 120 may not perform prioritization of the UE 120 is an Industrial Internet of Things device, which may reduce power consumption. As other examples, the device type may relate to a power optimization device type, a limited mobility device type, a device type accessing a particular RAT (e.g., LTE, NR, etc.), or the like. In some aspects, the trigger condition may be associated with a radio access technology (RAT) of the UE 120, such as an LTE RAT, an NR RAT, a 6G RAT, or the like. For example, the UE 120 may perform prioritization if the UE 120 is using a particular RAT.

In some aspects, the order may change from time to time. For example, the UE 120 may change the priority based at least in part on receiving a number of measurement objects. In such examples, the UE 120 may change a parameter indicated by the priority once every Xth measurement object is configured. For example, the UE 120 may change the priority such that FDD carriers are prioritized over TDD carriers in FR1 after X measurement objects are configured, and the UE 120 may revert the change after another X measurement objects are configured. In this way, the UE 120 may maintain current data regarding both FDD and TDD carriers, which improves accuracy of measurement prioritization.

As shown by reference number 540, the UE 120 may perform measurements in accordance with the order. For example, the UE 120 may perform a first measurement on a cell associated with a first position in the order (e.g., associated with a highest aggregated downlink bandwidth), may perform a second measurement on a cell associated with a second position in the order, and so on. The UE 120 may perform the measurements based at least in part on the measurement configuration, such as at time and frequency resources indicated by the measurement configuration.

As shown by reference number 550, the UE 120 may report at least a subset of the measurements. For example, as shown by reference number 560, the UE 120 may transmit at least one measurement report associated with at least a subset of the measurements. In some aspects, the UE 120 may transmit the measurement reports based at least in part on the order. For example, considering a set of measurement reports regarding measurements that satisfy reporting criteria, the UE 120 may first transmit a measurement report associated with a cell with a highest position in the order, then may second transmit a measurement associated with a cell with a second-highest position in the order, and so on. Thus, the UE 120 may prioritize measurement and reporting of cells based at least in part on aggregate downlink bandwidths of the cells, which increases the likelihood that a cell associated with a higher aggregate downlink bandwidth is selected (e.g., for handover, reselection, or the like) before a cell associated with a lower aggregate downlink bandwidth.

In some aspects, the UE 120 may prioritize transmission among multiple measurement reports. For example, if multiple measurement reports are ready for transmission by the UE 120, the UE 120 may drop one or more measurement reports with a measurement (e.g., a signal to interference plus noise (SINR) measurement or the like) that is lower than a threshold (e.g., the UE 120 may drop all measurement reports with the measurement that is lower than the threshold). In some aspects, the UE 120 may assign an order to multiple measurement reports. For example, if multiple measurement reports are ready for transmission by the UE 120, then the UE 120 may assign an order to the multiple measurement reports based at least in part on a measurement (e.g., an RSRP or the like) associated with the multiple measurement reports, a number of MIMO layers supported by the UE 120 in a band associated with a measurement report, and a bandwidth associated with the measurement report (e.g., a bandwidth of a cell associated with the measurement report, a maximum calibrated bandwidth for the NR RAT, or the like). In some examples, the UE 120 may assign the order in accordance with an offset RSRP of the multiple measurement reports, wherein the offset RSRP is determined as Offset RSRP=Measured RSRP (dBm)+K* (BW*maxLayers/10*2), where K=0 if the RSRP is lower than a lower threshold (e.g., −105 dBm), K=0.5 if the RSRP is between the lower threshold and a higher threshold (e.g., −70 dBm), and K=1 if the RSRP is higher than the higher threshold. maxLayers may be an advertised MIMO layer capability of the UE for an associated band (assuming one component carrier). BW may include information regarding a bandwidth, which may be determined using an acquisition database of the UE 120, a calibrated bandwidth (e.g., a maximum NR radio frequency calibrated bandwidth), or the like.

In some aspects, a first measurement report and a second measurement report may be associated with the same aggregated downlink bandwidth and the same individual downlink bandwidth. In such examples, the UE 120 may assign an order to the first measurement report and the second measurement report based at least in part on respective duplexing configurations and/or measurements associated with the first measurement report and the second measurement report. For example, the UE 120 may prioritize transmission of a measurement report associated with a TDD cell over a measurement report associated with an FDD cell if the TDD cell is associated with a measurement value that is better than a measurement value associated with the FDD cell by at least a threshold (e.g., 8 dB in one example). If the measurement value of the TDD cell is not better than the measurement value associated with the FDD cell by at least the threshold, then the UE 120 may prioritize transmission of the measurement report associated with the FDD cell.

As shown by reference number 570, the UE 120 and the BS 110 may optionally communicate based at least in part on the measurement report(s). For example, the BS 110 may trigger handover or reselection of the UE 120.

As indicated above, FIG. 5 is provided as an example. Other examples may differ from what is described with regard to FIG. 5.

Figure 6:
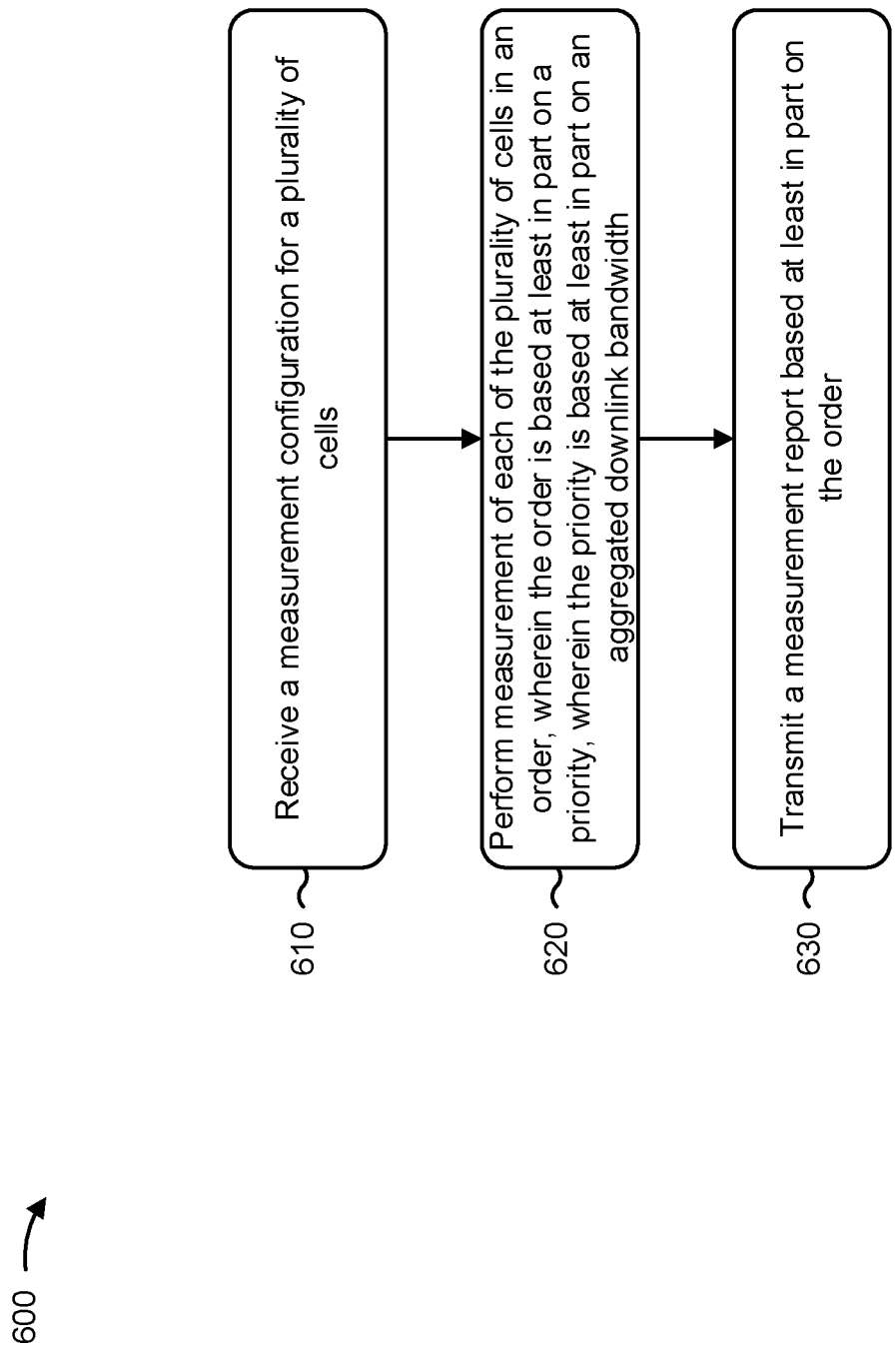
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with measurement ordering for carrier aggregation.

As shown in FIG. 6, in some aspects, process 600 may include receiving a measurement configuration for a plurality of cells (block 610). For example, the UE (e.g., using communication manager 140 and/or reception component 702, depicted in FIG. 7) may receive a measurement configuration for a plurality of cells, as described above.

As further shown in FIG. 6, in some aspects, process 600 may include performing measurement of each of the plurality of cells in an order, wherein the order is based at least in part on a priority, wherein the priority is based at least in part on an aggregated downlink bandwidth (block 620). For example, the UE (e.g., using communication manager 140 and/or measurement component 708, depicted in FIG. 7) may perform measurement of each of the plurality of cells in an order, wherein the order is based at least in part on a priority, wherein the priority is based at least in part on an aggregated downlink bandwidth, as described above.

As further shown in FIG. 6, in some aspects, process 600 may include transmitting a measurement report based at least in part on the order (block 630). For example, the UE (e.g., using communication manager 140 and/or transmission component 704, depicted in FIG. 7) may transmit a measurement report based at least in part on the order, as described above.

Process 600 may include additional aspects, such as any single aspect or any combination of aspects described below and/or in connection with one or more other processes described elsewhere herein.

In a first aspect, the aggregated downlink bandwidth is based at least in part on a combined bandwidth of a group of cells of a carrier aggregation configuration.

In a second aspect, alone or in combination with the first aspect, a first cell and a second cell of the plurality of cells are associated with a same aggregated downlink bandwidth, and wherein the order is based at least in part on an individual downlink bandwidth of the first cell and an individual downlink bandwidth of the second cell.

In a third aspect, alone or in combination with one or more of the first and second aspects, a first cell and a second cell of the plurality of cells are associated with a same aggregated downlink bandwidth and a same individual downlink bandwidth, and wherein the order is based at least in part on a duplexing configuration of one or more of the first cell or the second cell.

In a fourth aspect, alone or in combination with one or more of the first through third aspects, the order is based at least in part on whether each of the plurality of cells is a time division duplexing cell or a frequency division duplexing cell.

The method of claim 5, wherein, if less than a threshold number of measurement objects have been received, time division duplexing cells are prioritized, and if at least the threshold number of measurement objects have been received, frequency division duplexing cells are prioritized.

In a fifth aspect, alone or in combination with one or more of the first through fourth aspects, the measurement report is a first measurement report associated with a first cell of the plurality of cells, and wherein the method further comprises transmitting a second measurement report, associated with a second cell of the plurality of cells, after the first measurement report, based at least in part on the second cell having an aggregated downlink bandwidth that is narrower than an aggregated downlink bandwidth of the first cell.

In a sixth aspect, alone or in combination with one or more of the first through fifth aspects, process 600 includes assigning a reporting order to a plurality of measurement reports, associated with the plurality of cells and including the transmitted measurement report, based at least in part on at least one of a measurement value associated with the plurality of measurement reports, a number of multiple-input multiple-output layers associated with one or more bands associated with the plurality of cells, or a respective bandwidth for each cell of the plurality of cells.

In a seventh aspect, alone or in combination with one or more of the first through sixth aspects, process 600 includes discarding a measurement report of the plurality of measurement reports based at least in part on the measurement report being associated with a measurement value that fails to satisfy a threshold.

In an eighth aspect, alone or in combination with one or more of the first through seventh aspects, the order is based at least in part on a database, populated by the UE, indicating at least one of aggregating downlink bandwidths associated with one or more cells, a measurement associated with the one or more cells, or a duplexing configuration of the one or more cells.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
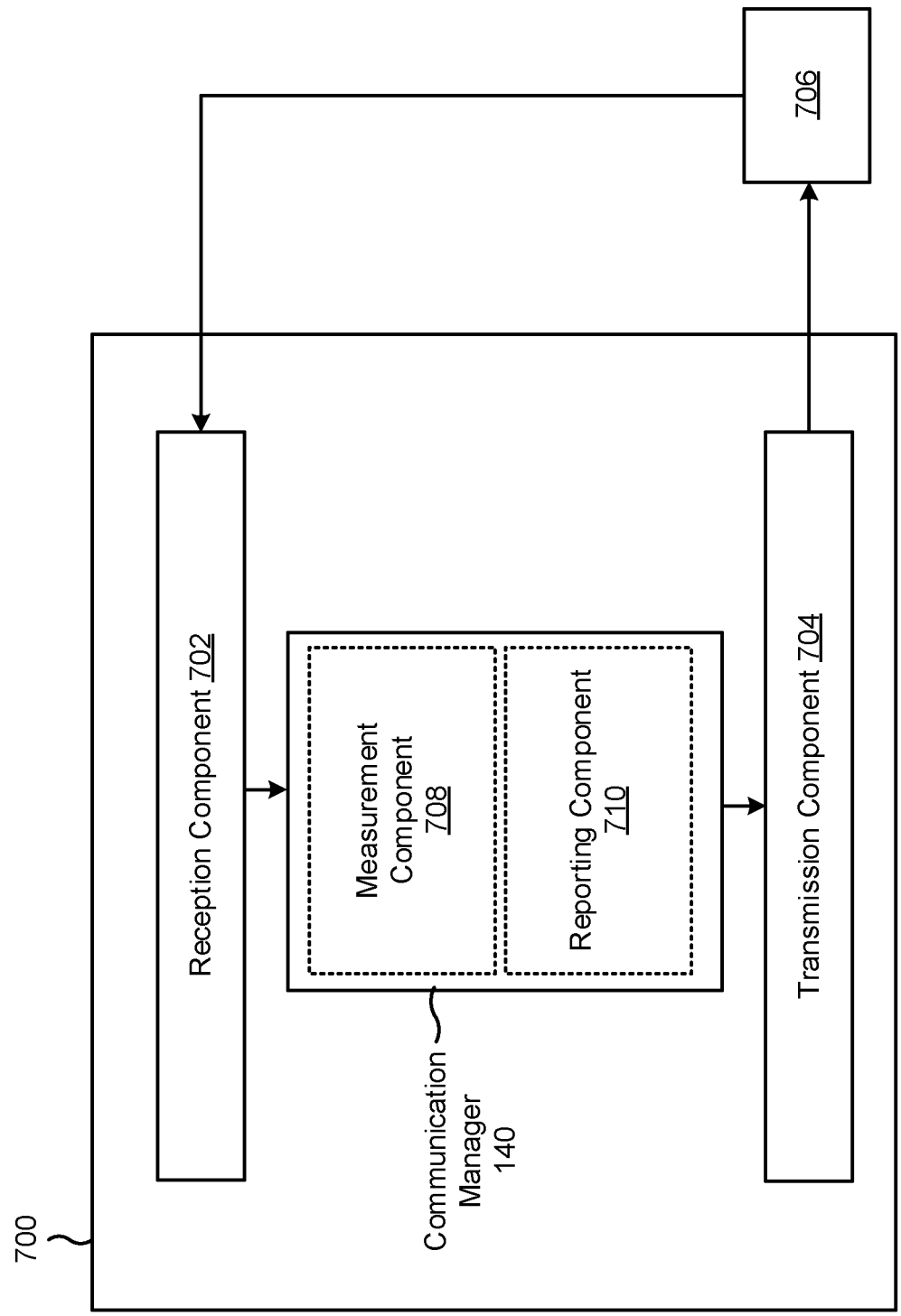
FIG. 7 is a diagram of an example apparatus for wireless communication, in accordance with the present disclosure.

FIG. 7 is a diagram of an example apparatus 700 for wireless communication, in accordance with the present disclosure. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of a measurement component 708 or a reporting component 710, among other examples.

In some aspects, the apparatus 700 may be configured to perform one or more operations described herein in connection with FIGS. 3-5. Additionally, or alternatively, the apparatus 700 may be configured to perform one or more processes described herein, such as process 600 of FIG. 6, or a combination thereof. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive a measurement configuration for a plurality of cells. The measurement component 708 may perform measurement of each of the plurality of cells in an order, wherein the order is based at least in part on a priority, wherein the priority is based at least in part on an aggregated downlink bandwidth. The transmission component 704 or the reporting component 710 may transmit a measurement report based at least in part on the order.

The reporting component 710 may assign a reporting order to a plurality of measurement reports, associated with the plurality of cells and including the transmitted measurement report, based at least in part on at least one of a measurement value associated with the plurality of measurement reports, a number of multiple-input multiple-output layers associated with one or more bands associated with the plurality of cells, or a respective bandwidth for each cell of the plurality of cells.

The reporting component 710 may discard a measurement report of the plurality of measurement reports based at least in part on the measurement report being associated with a measurement value that fails to satisfy a threshold.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: receiving a measurement configuration for a plurality of cells; performing measurement of each of the plurality of cells in an order, wherein the order is based at least in part on a priority, wherein the priority is based at least in part on an aggregated downlink bandwidth; and transmitting a measurement report based at least in part on the order.

Aspect 2: The method of Aspect 1, wherein the aggregated downlink bandwidth is based at least in part on a combined bandwidth of a group of cells of a carrier aggregation configuration.

Aspect 3: The method of any of Aspects 1-2, wherein a first cell and a second cell of the plurality of cells are associated with a same aggregated downlink bandwidth, and wherein the order is based at least in part on an individual downlink bandwidth of the first cell and an individual downlink bandwidth of the second cell.

Aspect 4: The method of any of Aspects 1-3, wherein a first cell and a second cell of the plurality of cells are associated with a same aggregated downlink bandwidth and a same individual downlink bandwidth, and wherein the order is based at least in part on a duplexing configuration of one or more of the first cell or the second cell.

Aspect 5: The method of any of Aspects 1-4, wherein the order is based at least in part on whether each of the plurality of cells is a time division duplexing cell or a frequency division duplexing cell.

Aspect 6: The method of Aspect 5, wherein, if less than a threshold number of measurement objects have been received, time division duplexing cells are prioritized, and if at least the threshold number of measurement objects have been received, frequency division duplexing cells are prioritized.

Aspect 7: The method of any of Aspects 1-6, wherein the measurement report is a first measurement report associated with a first cell of the plurality of cells, and wherein the method further comprises transmitting a second measurement report, associated with a second cell of the plurality of cells, after the first measurement report, based at least in part on the second cell having an aggregated downlink bandwidth that is narrower than an aggregated downlink bandwidth of the first cell.

Aspect 8: The method of any of Aspects 1-7, further comprising assigning a reporting order to a plurality of measurement reports, associated with the plurality of cells and including the transmitted measurement report, based at least in part on at least one of: a measurement value associated with the plurality of measurement reports, a number of multiple-input multiple-output layers associated with one or more bands associated with the plurality of cells, or a respective bandwidth for each cell of the plurality of cells.

Aspect 9: The method of Aspect 8, further comprising discarding a measurement report of the plurality of measurement reports based at least in part on the measurement report being associated with a measurement value that fails to satisfy a threshold.

Aspect 10: The method of any of Aspects 1-9, wherein the order is based at least in part on a database, populated by the UE, indicating at least one of: aggregated downlink bandwidths associated with one or more cells, a measurement associated with the one or more cells, or a duplexing configuration of the one or more cells.

Aspect 11: The method of any of Aspects 1-10, wherein performing the measurement each of the plurality of cells in the order is based at least in part on at least one of: an achievable data rate associated with the plurality of cells, a network capability, a service associated with the UE, a cost function, a context associated with the UE, or a device type of the UE.

Aspect 12: An apparatus for wireless communication at a device, comprising a processor; memory coupled with the processor; and instructions stored in the memory and executable by the processor to cause the apparatus to perform the method of one or more of Aspects 1-11.

Aspect 13: A device for wireless communication, comprising a memory and one or more processors coupled to the memory, the one or more processors configured to perform the method of one or more of Aspects 1-11.

Aspect 14: An apparatus for wireless communication, comprising at least one means for performing the method of one or more of Aspects 1-11.

Aspect 15: A non-transitory computer-readable medium storing code for wireless communication, the code comprising instructions executable by a processor to perform the method of one or more of Aspects 1-11.

Aspect 16: A non-transitory computer-readable medium storing a set of instructions for wireless communication, the set of instructions comprising one or more instructions that, when executed by one or more processors of a device, cause the device to perform the method of one or more of Aspects 1-11.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a measurement configuration for a plurality of cells;
   performing measurements on the plurality of cells in an order,
      wherein the order is associated with prioritizing the measurements, and
      wherein the order is based at least in part on an aggregated downlink bandwidth;
   dropping one or more first measurement reports with a measurement lower than a threshold; and
   transmitting one or more second measurement reports based at least in part on the order.

2. The method of claim 1, wherein the aggregated downlink bandwidth is based at least in part on a combined bandwidth of a group of cells of a carrier aggregation configuration.

3. The method of claim 1, wherein a first cell and a second cell of the plurality of cells are associated with a same aggregated downlink bandwidth, and wherein the order is based at least in part on an individual downlink bandwidth of the first cell and an individual downlink bandwidth of the second cell.

4. The method of claim 1, wherein a first cell and a second cell of the plurality of cells are associated with a same aggregated downlink bandwidth and a same individual downlink bandwidth, and wherein the order is based at least in part on a duplexing configuration of one or more of the first cell or the second cell.

5. The method of claim 1, wherein the order is based at least in part on whether each of the plurality of cells is a time division duplexing cell or a frequency division duplexing cell.

6. The method of claim 5, wherein, if less than a threshold number of measurement objects have been received, time division duplexing cells are prioritized, and if at least the threshold number of measurement objects have been received, frequency division duplexing cells are prioritized.

7. The method of claim 1, wherein transmitting the one or more second measurement reports comprises:
transmitting a measurement report, associated with a second cell of the plurality of cells, after a measurement report, associated with a first cell of the plurality of cells, based at least in part on the second cell having an aggregated downlink bandwidth that is narrower than an aggregated downlink bandwidth of the first cell.

8. The method of claim 1, further comprising assigning a reporting order to a plurality of measurement reports, associated with the plurality of cells and including the transmitted one or more second measurement reports, based at least in part on at least one of:
a measurement value associated with the plurality of measurement reports,
a number of multiple-input multiple-output layers associated with one or more bands associated with the plurality of cells, or
a respective bandwidth for each cell of the plurality of cells.

9. The method of claim 1, wherein the order is based at least in part on a database, populated by the UE, indicating at least one of:
aggregated downlink bandwidths associated with one or more cells,
a measurement associated with the one or more cells, or
a duplexing configuration of the one or more cells.

10. The method of claim 1, wherein performing the measurements on the plurality of cells in the order is based at least in part on at least one of:
an achievable data rate associated with the plurality of cells,
a network capability,
a service associated with the UE,
a cost function,
a context associated with the UE,
a radio access technology associated with the UE, or
a device type of the UE.

11. The method of claim 1, wherein the aggregated downlink bandwidth is a highest aggregated downlink bandwidth.

12. The method of claim 1, wherein dropping the one or more first measurement reports comprises
dropping all measurement reports with a measurement lower than the threshold.

13. A user equipment (UE) for wireless communication, comprising:
one or more memories; and
one or more processors, coupled to the one or more memories, configured to:
receive a measurement configuration for a plurality of cells;
perform measurements on the plurality of cells in an order,
wherein the order is associated with a prioritization of the measurements, and
wherein the order is based at least in part on an aggregated downlink bandwidth;
drop one or more first measurement reports with a measurement lower than a threshold; and
transmit one or more second measurement reports based at least in part on the order.

14. The UE of claim 13, wherein the aggregated downlink bandwidth is based at least in part on a combined bandwidth of a group of cells of a carrier aggregation configuration.

15. The UE of claim 13, wherein a first cell and a second cell of the plurality of cells are associated with a same aggregated downlink bandwidth, and wherein the order is based at least in part on an individual downlink bandwidth of the first cell and an individual downlink bandwidth of the second cell.

16. The UE of claim 13, wherein a first cell and a second cell of the plurality of cells are associated with a same aggregated downlink bandwidth and a same individual downlink bandwidth, and wherein the order is based at least in part on a duplexing configuration of one or more of the first cell or the second cell.

17. The UE of claim 13, wherein the order is based at least in part on whether each of the plurality of cells is a time division duplexing cell or a frequency division duplexing cell.

18. The UE of claim 17, wherein, if less than a threshold number of measurement objects have been received, time division duplexing cells are prioritized, and if at least the threshold number of measurement objects have been received, frequency division duplexing cells are prioritized.

19. The UE of claim 13, wherein the one or more processors, to transmit the one or more second measurement reports, are configured to transmit a measurement report, associated with a second cell of the plurality of cells, after a measurement report, associated with a first cell of the plurality of cells, based at least in part on the second cell having an aggregated downlink bandwidth that is narrower than an aggregated downlink bandwidth of the first cell.

20. The UE of claim 13, wherein the one or more processors are further configured to assign a reporting order to a plurality of measurement reports, associated with the plurality of cells and including the transmitted one or more second measurement reports, based at least in part on at least one of:
a measurement value associated with the plurality of measurement reports,
a number of multiple-input multiple-output layers associated with one or more bands associated with the plurality of cells, or
a respective bandwidth for each cell of the plurality of cells.

21. The UE of claim 13, wherein the order is based at least in part on a database, populated by the UE, indicating at least one of:
aggregated downlink bandwidths associated with one or more cells,
a measurement associated with the one or more cells, or
a duplexing configuration of the one or more cells.

22. The UE of claim 13, wherein the one or more processors, to perform the measurements on the plurality of cells in the order, are configured to perform measurements on the plurality of cells in the order based at least in part on at least one of:
an achievable data rate associated with the plurality of cells, a network capability,
a service associated with the UE,
a cost function,
a context associated with the UE,
a radio access technology associated with the UE, or
a device type of the UE.

23. A non-transitory computer-readable medium storing a set of instructions for wireless communication, the set of instructions comprising:
one or more instructions that, when executed by one or more processors of a user equipment (UE), cause the UE to:
receive a measurement configuration for a plurality of cells;
perform measurements on the plurality of cells in an order,
wherein the order is associated with a prioritization of the measurements, and
wherein the order is based at least in part on an aggregated downlink bandwidth;
drop one or more first measurement reports with a measurement lower than a threshold; and
transmit one or more second measurement reports based at least in part on the order.

24. The non-transitory computer-readable medium of claim 23, wherein the aggregated downlink bandwidth is based at least in part on a combined bandwidth of a group of cells of a carrier aggregation configuration.

25. The non-transitory computer-readable medium of claim 23, wherein a first cell and a second cell of the plurality of cells are associated with a same aggregated downlink bandwidth, and wherein the order is based at least in part on an individual downlink bandwidth of the first cell and an individual downlink bandwidth of the second cell.

26. The non-transitory computer-readable medium of claim 23, wherein a first cell and a second cell of the plurality of cells are associated with a same aggregated downlink bandwidth and a same individual downlink bandwidth, and wherein the order is based at least in part on a duplexing configuration of one or more of the first cell or the second cell.

27. An apparatus for wireless communication, comprising:
means for receiving a measurement configuration for a plurality of cells;
means for performing measurements on the plurality of cells in an order,
wherein the order is associated prioritizing the measurements, and
wherein the order is based at least in part on an aggregated downlink bandwidth;
means for dropping one or more first measurement reports with a measurement lower than a threshold; and
means for transmitting one or more second measurement reports based at least in part on the order.

28. The apparatus of claim 27, wherein the aggregated downlink bandwidth is based at least in part on a combined bandwidth of a group of cells of a carrier aggregation configuration.

29. The apparatus of claim 27, wherein a first cell and a second cell of the plurality of cells are associated with a same aggregated downlink bandwidth, and wherein the order is based at least in part on an individual downlink bandwidth of the first cell and an individual downlink bandwidth of the second cell.

30. The apparatus of claim 27, wherein a first cell and a second cell of the plurality of cells are associated with a same aggregated downlink bandwidth and a same individual downlink bandwidth, and wherein the order is based at least in part on a duplexing configuration of one or more of the first cell or the second cell.

* * * * *